United States Patent
Deindl et al.

[11] Patent Number: 6,031,910
[45] Date of Patent: Feb. 29, 2000

[54] METHOD AND SYSTEM FOR THE SECURE TRANSMISSION AND STORAGE OF PROTECTABLE INFORMATION

[75] Inventors: Michael Deindl, Boblingen; Martin Witzel, Schonaich, both of Germany

[73] Assignee: International Business Machines, Corp., Armonk, N.Y.

[21] Appl. No.: 08/890,010

[22] Filed: Jul. 10, 1997

[30] Foreign Application Priority Data

Jul. 24, 1996 [DE] Germany ............................ 196 29 856

[51] Int. Cl.[7] .................................................. H04L 9/30
[52] U.S. Cl. ............................................ 380/25; 235/382
[58] Field of Search ............................. 380/25; 235/382; 709/229; 713/201

[56] References Cited

U.S. PATENT DOCUMENTS

| | | | |
|---|---|---|---|
| 5,267,313 | 11/1993 | Hirata | 380/21 |
| 5,282,247 | 1/1994 | McLean et al. | 380/4 |
| 5,428,685 | 6/1995 | Kadooka et al. | 380/25 |
| 5,526,428 | 6/1996 | Arnold | 380/25 |
| 5,623,546 | 4/1997 | Hardy et al. | 380/4 |
| 5,745,571 | 4/1998 | Zuk | 380/21 |
| 5,802,175 | 9/1998 | Kara | 380/21 |
| 5,825,875 | 10/1998 | Ugon | 380/4 |

FOREIGN PATENT DOCUMENTS

0668578A2  3/1995  European Pat. Off. .

*Primary Examiner*—Gilberto Barron, Jr.
*Attorney, Agent, or Firm*—Scully, Scott, Murphy & Presser; Louis P. Herzberg

[57] ABSTRACT

A method and system for the secure transmission and storage of protectable information, such as patient information, by means of a patient card. The data stored on the patient card are protected by cryptographic methods. The data is decrypted only with the same patient card if a doctor is authorized and the patient has given his agreement. All information which the patient card needs in order to decide whether the doctor is authorized, and the key for protecting the control data and the random key are held on the chip. The patient data can be freely transmitted to any storage medium. The chip controls both the access to the data and the encryption and decryption functions. Random keys, which are themselves stored encrypted together with the data, ensure that every data record remains separate from every other data record, and that only authorized persons can access it. Every patient card has its own record key. The system and method in accordance with the invention is not directed exclusively to patient data but can be applied to any protectable data to which right of access is to be restricted.

20 Claims, 1 Drawing Sheet

METHOD AND SYSTEM FOR THE SECURE TRANSMISSION AND STORAGE OF PROTECTABLE INFORMATION

FIELD OF THE INVENTION

The invention relates to a method and a system for the secure transmission and storage of protectable information, in particular, of patient information stored on a patient card system.

BACKGROUND OF THE INVENTION

Smart card systems, such as patient card systems, should primarily serve the interests of the user/patient. The person-related medical data of a person stored on the patient card is particularly sensitive and hence worth protecting. In addition patients are often in a very weak state and are not in a position to deal positively with their protection. Consequently, laws and agreements must be adopted in order to set in place the legal and technical framework which will support the patient in protecting these sensitive cards.

Chip cards (smart cards) normally offer all the necessary control mechanisms with which the data in the non-volatile storage on the chip are protected. On one hand, the chip is effectively protected against physical access from outside, on the other hand an operating system monitors all accesses to the data and rejects attempts to read and/or write if the user cannot be authenticated and/or cannot enter a PIN. The chip thus prevents the protected data being read from outside through its data lines. Because of their recognized high security, chip cards are employed as identification systems primarily in the financial area.

The optical storage of the optical memory chip card uses the known technology employed in CDs and CD-ROMs. Because of its high storage capacity it is well suited to the storage of large amounts of data. It is, however, a disadvantage of this storage, that it provides no physical protection for the data. Anyone who has a reader is able to read the data. In spite of this, the data can be protected logically in that the data can be stored in encoded form. The coding of the data is also known under the technical term "cryptography".

The problem with all symmetrical encryption procedures is the confidential distribution of the decryption key between the parties involved. The greater the number of parties who wish to communicate with one another, the more insurmountable the problem of key management becomes. It would be easy to solve if all participants were to use the same key. However, this would mean that every one of them could read what two participants had encrypted between them and, in the event of a successful access from outside to this one key, the whole system would be open. If each participant were to have his own key, successful access to a key would be limited to the information which is sent to and received by one key holder. The other keyholders remain protected.

The problem of key exchange is even more problematical when it involves not just one sender and several receivers, that is, a 1-to-N relationship, but an n-to-N relationship. For example, every doctor may be the sender of information and any other authorized doctor must be able to read it. As already stated, the doctors should in no case have to agree to a key which is usable throughout the whole system before they can communicate. On the other hand, the participating doctors cannot all be expected to exchange their keys with one another beforehand.

European Patent EP 0668 578 describes a memory and selective information system for the transfer of sensitive data comprising an optical memory card, on which a spatially defined storage field for the exclusive storage of a plurality of codes arranged so as to have at least one for each key access, at least one read/write device for the optical memory card with a plurality of key-recognition functions, where each key recognition function points to each of a plurality of formatting functions contained in the read/write device and activates the latter in conjunction with the code assigned to each, where each formatting function points to a data storage field of the optical card and qualifies the data stored thereon for reading on the basis of the formatting data. One disadvantage of this process is that there is a key region and a data region on the optical storage medium. Two separate accesses to the optical storage medium are therefore necessary in order to read the key and the data. The process described in EP 0668 578 uses fixed keys, i. e. keys are predetermined in accordance with a particular procedure by the system. The read/write device is an important constituent for the decision as to which key should be used. This depends on the code, the formatting functions and the decision functions. Usually the present process is limited only to optical storage media.

SUMMARY OF THE INVENTION

An object of the present invention is a storage and information system and method for the transfer of information required to be protected, which allows a maximal exchange of the information between a plurality of users, but ensures in doing so, that the system/method only permits the entry and reading of said information to those authorized therefor.

In the present invention the encrypted data and the associated key are stored together in one file. In this way the encrypted data is stored without security risk anywhere, e. g. in a computer, in a database, or is distributed over a network, regardless of the storage medium on which they were initially recorded. Within the file there may be data of differing degrees of confidentiality which can only be written or read with certain access authorizations. The data are stored encrypted with a random key. The random key, for its part, is encoded in the chip card and stored with the data. In this way, the decryption of the data is made considerably more difficult. The method of key generation takes place exclusively on the chip card. The authorized person consequently always has full control over access to his data.

BRIEF DESCRIPTION OF THE DRAWINGS

An embodiment of the present invention is hereinafter explained and described in more detail with the aid of drawings, in which.

DETAILED DESCRIPTION OF THE INVENTION

This invention includes an apparatus and method for a storage and information transmission system. In an embodiment, the system apparatus includes a chip card to which an owner can be assigned; a computer; an authorizing terminal connected within or to the computer by means of which an authorization of an user can be effected; a read/write device by means of which data is exchanged between the computer and the chip card; and at least one storage medium coupled to the computer such that data can be exchanged between the computer and the storage medium. The chip card includes a generator with which a new cryptographic key can be produced whenever the computer requires a new cryptographic key. In some embodiments, the system includes an identification terminal connected to and/or the computer. The identification terminal allows a confirmation of the owner of the chip card to be entered. Often the confirmation is by way of a personal identification number. Sometimes the system includes an authorization card with which the authorization is carried out and/or the storage medium is arranged on the chip card. The storage medium may be designed as a fixed disk memory and/or optical memory. In some embodiments the computer is arranged in a computer network of a plurality of computers, and the storage medium is arranged in of the network computers. Frequently, the data stored in the storage medium, comprises encrypted data and an encryption of its cryptographic key generator by the chip card, and the chip card stores a second cryptographic key for encrypting the encrypted cryptographic key.

Figure 1:
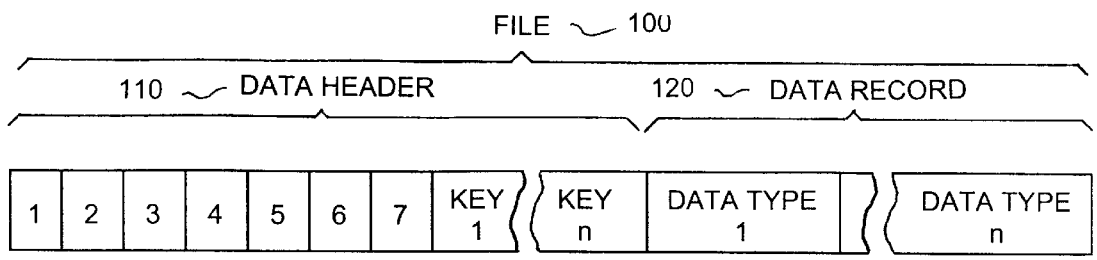
FIG. 1 is a diagrammatic representation of the file structure in accordance with the invention.

FIG. 1 shows the structure of a file structure 100 in accordance with the invention, consisting of the data header 110 and the data record 120. The header 110 consists, for example, of the control data fields 1–7. The data record 120 may consist of several data types 1-n, which are stored in the data record. Each type of data is coded with its own random key. This random key and a part of the control data which has to be protected, is in turn encrypted with a fixed key stored on the chip card. The chip card itself encrypts the control data and the random key. In this way, the confidential fixed key never leaves the chip card.

The secrecy stage, for example, of the data types contained in the files, is laid down in management fields 1 and 7, that is, each data type is characterized by its own secrecy stage with the associated key. There are data types which should always be readable, such as for example, emergency data. There are data types which must only be readable with the agreement of the patient and/or only be accessible to certain groups of user. Which data are to be classified in which data type usually depends on the data protection legislation of the country concerned. As a general rule, each data type should be accessible only to certain user groups. For example, pharmacists should only be able to access data which they require for their activities. The authorized user groups which have access to a particular data type are defined in the management fields. For example, it can be decided that the pharmacists only have access to prescriptions and doctor's advice on contraindications. The following data types are therefore established:

Type 0 data—includes data that are always readable data that are not encrypted.

Type 1 data—includes data that are only readable after entry of the patient's PIN.

Type 2 data—includes data that are only read after authorization by a doctor in any specialty and after entry of the patient's PIN.

Type 3 data—same as Type 2 data, with the addition that here the data is only read after authorization by a doctor in a specific specialty.

Type 4 data—reserved for later use.

Type 5 data—includes data that is readable by both doctor and pharmacist without requiring the patient's PIN. This type of data is directed towards members of a particular group, e.g. only to radiologists, pharmacists or to all. Several precisely specified target groups can also be entered as a list.

The types of data mentioned are stored in the data record separate from one another. In addition, data of various specialist groups or data intended only for a specific target group are each held in different files.

Each data record includes control data from which the type of data record (emergency data/pharmacist's data/clinical data), the types (0–5) of data contained, the specialty of the doctor who wrote the data record, his name, his identification, data, time and the target group for the data, can be determined. The target groups who may read the data can also be defined as "all". Each type of data is encrypted with its own random key. This random key and a part of the control data which has to be protected is, for its part, encrypted with a fixed key stored on the chip card. The chip card itself encrypts the control data and the random key. Consequently, the secret fixed key never leaves the chip card. Only the chip itself encrypts the control data and random key, after it has checked whether either the doctor could be authorized for either the target group held in the control information. If the doctor does not belong to this target group, then he may only access these data with the agreement of the patient.

Figure 2:
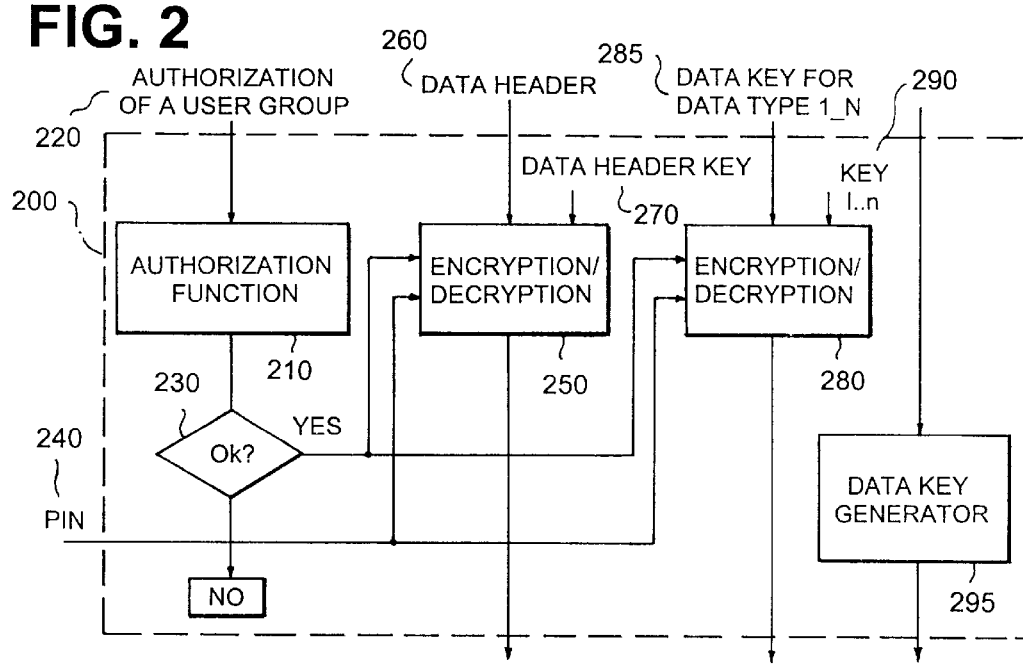
FIG. 2 is a flow chart of the reading and writing process illustrating the information and transfer system in accordance with the invention.

FIG. 2 describes an embodiment of individual steps 200 in the reading and writing of the data in the form of a flow diagram. FIG. 2 shows an authorization function block 210, which acts to authorize a member of a user group 220. If the authorization is OK 230, the PIN 240 and the authorization enable the encryption and/or decryption 250 of a data header 260 in the presence of the data-header-key 270. Similarly, the PIN 240 and the authorization enable the encryption and/or decryption 280 of data-key for data-type '1__N' 285, in the presence of the key-'1__N' 290. A data generator 295 generates the data-key upon request.

Figure 3:
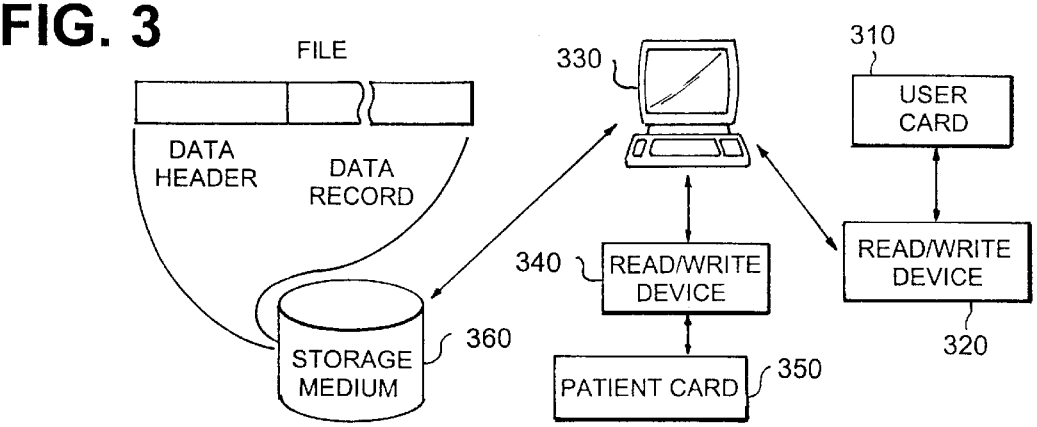
FIG. 3 shows the method of operation of the information and transfer system in accordance with the invention with the aid of the requisite hardware.

Prerequisites for the reading and writing of data by means of the system and method in accordance with the invention are shown in FIG. 3. These include the patient card 350, user card 310, reading and writing devices 320, 340 and a computer system 330 for controlling the process. Particularly suitable as patient cards are optical cards. Any other chip card may also be employed. The patient card consists preferably of an optical bulk storage and a chip, which contains the cryptographic function. The chip of an optical chip card further serves as the protected communication channel over which two parties can transmit a key, while it stores the key securely. Each patient card contains its own record key, which does not even need to be known to the card supplier. The patient card never discloses the key to the exterior. The patient card blocks the encryption and decryption functions until a doctor duly authorizes it.

In reading a file the doctor must be in possession of a user card 310. The user card 310 legitimizes the doctor as an authorized doctor in a particular specialty. In one embodiment, this is accomplished employing an authorizing terminal within, or connected with, said computer by means of which the authorization of the user can be effected. The user card is read by a reader or reading/writing device 320. The user card 310 is technically not absolutely essential for every legitimation since the user group information on the doctor may already be set down in secure form in the doctor system. In addition, it is necessary for the patient to insert his patient card into a reading/writing device. If the doctor is authorized, the system first gives him access to data which is accessible to every user group. These data are also not encrypted (emergency data).

If the doctor requires access to protected data, the user card 310 must contain information on the group to which the doctor belongs (e.g. dermatologist, pulmonary doctor, etc.). For this the system takes the relevant information on the user group to which the user belongs from the user card 310 and calls up an authorization command from the patient card 350. The patient card 350 verifies whether the user belongs to the user group mentioned and holds this information on the patient card 350. A user may belong to several user groups. The system then reads a file which contains medical data on the patient and separates the file into data header 110 and data record 120. The data header with the control data with a decryption command is then transmitted to the patient card. Before the patient card 310 decrypts the data header 110, it checks to see whether there is any authorization. In the event that there is an authorization and that the user is identical with the user group of the target group of the data header 110, it returns the decrypted data header 110 to the system. The system takes the desired key from the data header 110 and sends it to the patient card for decryption. The decrypted key is returned to the system, whereupon the system now decrypts the data record 120 of the corresponding data type with a suitable decryption program.

In writing data the procedure is exactly the reverse, with the distinction that the key is produced by the data key generator on the patient card 350. In this way the system first encodes the data record 120, where each data type in the data record 120 is encrypted with its own random key. The key is then sent to the patient card 350 for encrypting. The data header 110 is then built up and the system likewise sends the data header 110 to the patient card 350 for encrypting. The result is an encrypted data record 120 with an encrypted key and encrypted control data, which are also required for access to the data.

For example, it can be required that only doctors have the right to post medical data to the patient card 350 or that pharmacists have only limited right to write, and that they can only read and write data related to their specialty. Thus they can cancel a prescription if they have sold a medicine, can store notes on the manufacturer and batch number and the like. The patient must always first agree before the doctor can write medical data to the card. The doctor therefore has the responsibility of checking with the patient what he can write on the card, so that the patient can give his approval or disapproval.

If a doctor wishes to write data to a patient card 350 he must have been authorized as a doctor. This is effected as in the reading process by means of a user card 310. From the user card 310, the relevant specialist group is obtained. The patient must likewise be legitimized by entering his PIN as the authorized owner of the patient card 350 and have given his agreement before the doctor can write to a file. In one embodiment, an identification terminal is within or connected to the computer. The identification terminal allows a confirmation of the owner of the chip card to be entered. Given the appropriate authorization key the patient card 350 will establish that it relates to a doctor in a particular specialist group. A doctor may also be in possession of several authorization keys if he is a specialist in several fields.

This encrypted data record 120 with encrypted key and encrypted control data can be written to optical storage media or the chip of the optical storage card, stored in a computer or sent over a network. A doctor can again have access to this data only with the consent of the patient. It is also possible to file the data from an optical chip card and make a duplicate if the original is lost.

FIG. 3 shows the basic structure of an information and transmission system for the storage and transmission of protected data, in particular patient data. The system consists in essence of a computer 330, a read/write device 340 for patient cards, a patient card 350, a read/write device 320 for the user card 310 and a user card 310. Technically, it is also possible to employ a single read/write device for both the patient card and the user card. The patient data are either stored on the patient card 350 or can be stored on any other desired storage medium 360. In cases where the patient data is stored on the patient card 350 an optical mass memory is preferably used. The patient card 350 is preferably a chip card with an optical mass memory. It is always necessary for writing or reading the data. The following important data/functions are stored on the patient card 350: authorizing key for the relevant user groups, encryption key for the data key, encryption key for the data header, generator for the production of data keys and encryption and decryption functions.

In an embodiment, the method for storing information on at least one storage medium with the aid of a chip card, includes the steps of: authorizing a user assigned to a user group by means of an identification feature; generating one or more cryptographic keys in the chip card for use by a computer; transmitting at least one of the cryptographic keys from the chip card to the computer; encrypting at least one set of data by means of the cryptographic key in the computer; encrypting at least one of the cryptographic keys in the chip card with a second cryptographic key which is not provided to the computer to form an encrypted key; and storing the set of encrypted data with the encrypted key on the storage medium.

Often, the step of authorizing is effected by means of an authorization terminal which is connected to the computer and an authorization card which is inserted into the authorization terminal. Frequently, the method includes the step of entering a surety. The surety may be a personal identification number, a password and/or a biometric identification method. In some instances the surety is entered before the chip card carries out an encryption or decription. Sometimes the step of encrypting at least one of the cryptographic keys is performed with the aid of a card key disposed on the chip card.

In an embodiment, the method further includes the step of producing a data header in the computer for each of a plurality of data records, where the data header indicates to which of a plurality of user groups a particular user that is writing belongs to, and/or the data header includes a requirements list that must be fulfilled for allowing the data record to be read, and/or the cryptographic key encrypted by means of the card key is disposed in the data header, and/or the encrypted data header and the encrypted data record are assembled to a file stored on the storage medium, and/or the computer is disposed in a computer network of a plurality of computers, and the storage medium is disposed in a desired computer on the network.

In another embodiment of the present invention, a method for reading information from a storage medium with the aid of a chip card includes the following steps: authorizing a user by means of an identification feature which is assigned to a user group; transmitting a file from the storage medium to a computer, wherein the file comprises an encrypted data header and an encrypted data record; transferring the encrypted data header from the computer to the chip card; decrypting the encrypted data header into a decrypted data header by means of a card key on the chip card; transmitting the decrypted data header from the chip card to the computer; determining a target user group from the decrypted data header; and decrypting the encrypted data record by means of a cryptographic key when the user group of the user and the target user group of the data header are verified, otherwise withholding and/or limiting access to the data record.

The present invention was described using patient cards 350 exclusively as an example. It is noted, that the system and method in accordance with the invention can also be applied to all data worth protecting, where a limited right of access to certain data on a person, company, bank, an authority or other institution is to be permitted. This applies particularly to application with the following framework conditions:

- the owner of data can set up and use various security levels,
- the data may be made accessible only to a particular target group or a number of target groups,
- with certain security levels authorization of the right to read can be enforced (e. g. with the user card),
- with certain security levels an identification and agreement of the possessor of the chip card can be enforced, e.g. by entry of a PIN.

As an example of the use of the present invention a chip bank card may be considered, on which value of personal or company assets are stored. The owner of this chip bank card may only permit the relevant bank to have limited right of access. A further example could be a chip credit card. The present invention can therefore be applied to all applications for the storage and transmission of protectable data without any alteration to the method and system in accordance with the invention.

The present invention can be briefly summarized as follows. The data stored on the patient card be protected by cryptographic methods. Only the same patient card can decrypt the data again, if the patient has agreed and a doctor is authorized. All information which the patient card uses in order to decide whether the doctor is authorized is stored, together with the key for the protection of the control data and random key, on the chip. The patient data can, but does not have to be stored on the chip. The chip controls both access to the data and also the encryption and decryption functions. Random keys, which are themselves stored encrypted together with the data, ensure that each data record remains separate and that only authorized persons have access. Each patient card has its own record key. Should the random key for one data record be broken, the other data records on the card and all other cards in the system remain unaffected. If the key to the encryption of the random keys of a patient card be broken, the data on all the other cards in the system would remain secure. The keys on the patient card used for authorization are derived from a feature of the patient card and therefore differ from patient card to patient card. If a patient card were broken, only the keys not yet used in the system would be open.

Members of the health service authorize themselves in respect of the patient cards with their user cards. The user card contains a set of group keys which the system operator defines. Only if a doctor is authorized with a key and the patient has agreed with his PIN number, can the doctor access the data. The group key varies according to his job in the health service and in accordance with medical specialty.

Data may be classified differently according to the need for protection. The classes differ according to whether a user requires to be authorized or not and whether the patient has to agree or not.

Although the description is made for a particular structure and arrangement using patient/doctor card systems, the intent and concept of the present invention are suitable and applicable to other smart card applications and arrangements. For example, the method can be employed for banking applications. Those skilled in the art can reconfigure the structure and method described. Thus, it will be clear to those skilled in the art that other modifications to the disclosed embodiments can be effected without departing from the spirit and scope of the invention.

What is claimed is:

1. A storage and information transmission system comprising:
- a chip card to which an owner can be assigned;
- a computer;
- an authorizing terminal connected with said computer by means of which an authorization of an user can be effected;
- a read/write device coupled to the computer and the chip card, wherein data is exchanged between the computer and the chip card; and
- at least one storage medium coupled to said computer such that data can be exchanged between the computer and the storage medium,
- wherein said chip card includes a generator with which a new cryptographic key can be produced whenever the computer requires said new cryptographic key and the data in said at least one storage medium comprises encrypted data and an encryption of its cryptographic key generated by the chip card, the chip card generating and storing a second cryptographic key for encrypting the encrypted cryptographic key.

2. A storage and information transmission system in accordance with claim 1, further comprising:
- an identification terminal connected to the computer, said identification terminal allows a confirmation of the owner of the chip card to be entered.

3. A storage and information transmission system as in claim 2, wherein said confirmation is a personal identification number.

4. A storage and information transmission system in accordance with claim 1, further comprising an authorization card with which said authorization is carried out.

5. A storage and information transmission system in accordance with claim 1, wherein the storage medium is arranged on the chip card.

6. A storage and information transmission system in accordance with claim 1, wherein the storage medium is designed as a fixed disk memory.

7. A storage and information transmission system in accordance with claim 1, wherein the storage medium is optical memory.

8. A storage and information transmission system in accordance with claim 1, wherein the computer is arranged in a computer network of a plurality of computers, and the storage medium is arranged in any of said computers in the network.

9. A method for storing information on at least one storage medium with the aid of a chip card, comprising the steps of:
- authorizing a user by means of an identification feature assigned to a user group;
- generating for a computer one or more cryptographic keys in the chip card;
- transmitting at least one of the cryptographic keys from the chip card to the computer;

encrypting at least one set of data by means of the cryptographic key in the computer;

encrypting at least one of the cryptographic keys in the chip card with a second cryptographic key which is not provided to the computer to form an encrypted key; and storing the set of encrypted data with the encrypted key on the storage medium.

10. A method as in claim 9, wherein said step of authorizing is effected by means of an authorization terminal which is connected to the computer and an authorization card which is inserted into the authorization terminal.

11. A method as in claim 9, further comprising the step of entering a surety.

12. A method as in claim 11, wherein said surety is a biometric identification method.

13. A method as in claim 12, wherein the surety is entered before the chip card carries out an encryption.

14. A method as in claim 9, wherein said step of encrypting at least one of the cryptographic keys is performed with the aid of a card key, wherein the card key is disposed on the chip card.

15. A method as in claim 9, further comprising the step of producing a data header in the computer for each of a plurality of data records, where the data header indicates to which of a plurality of user groups a particular user that is writing, belongs to.

16. A method as in claim 15 wherein said data header includes a requirements list that must be fulfilled for reading the data record.

17. Method as in claim 15, wherein the cryptographic key encrypted by means of the card key is disposed in the data header.

18. A method as in claim 17, wherein the encrypted data header and the encrypted data record are assembled to a file stored on the storage medium.

19. A method as in claim 9, wherein the computer is disposed in a computer network of a plurality of computers, and the storage medium is disposed in a desired computer on the network.

20. A method for reading information from a storage medium with the aid of a chip card comprising the following steps:

authorizing a user by means of an identification feature which is assigned to a user group;

transmitting a file from the storage medium to a computer, said file comprising an encrypted data header and an encrypted data record;

transferring the encrypted data header from the computer to the chip card;

decrypting the encrypted data header into a decrypted data header by means of a card key on the chip card, the decrypted header having a cryptographic key;

transmitting the decrypted data header from the chip card to the computer;

determining a target user group from the decrypted data header; and decrypting the encrypted data record by means of the cryptographic key when the user group of the user and the target user group of the data header are verified, limiting access to the data record otherwise.

* * * * *